Patented Aug. 18, 1931

1,819,136

UNITED STATES PATENT OFFICE

FRANCIS CLIFFORD DYCHE-TEAGUE, OF LONDON, ENGLAND

PROCESS FOR THE PRODUCTION OF PLASTIC PRODUCTS, PAINTS, AND LACQUERS

No Drawing. Application filed February 2, 1928, Serial No. 251,470, and in Great Britain September 13, 1927.

The object of the invention is the production of a plastic product which can be used alone or with fillers in the manufacture of articles by moulding under heat and pressure, or can be used in a suitable solvent as a paint or lacquer, suitable pigments, gums or other lacquer constituents being added if desired according to the colour or other variations in the paint or lacquer required.

The product obtained in accordance with the invention is stable under ordinary atmospheric conditions, is unaffected by strong acids and alkalies and produces solutions of low viscosity, for instance, a 30% solution of the product in benzene is approximately the same viscosity as raw linseed oil.

This product according to the invention is produced by disaggregating rubber and chlorinating the disaggregated product.

In one mode of carrying out the invention rubber is disaggregated when it is changed from a viscous solid material into a flabby or semi-liquid mass by thoroughly working it in a mill, which, for example, may comprise a number of co-acting, but preferably differential, rollers between which the rubber is repeatedly rolled under pressure, preferably with intervals of rest of about fifteen minutes each between the rolling operations. With such a mill a working period of two hours is usually sufficient to effect the required change of state.

The flabby or semi-liquid mass so obtained is made into a solution with a suitable solvent such as, for instance, the chlorinated hydrocarbons such as carbon tetrachloride, trichlor ethylene or benzene.

It is preferred, next, to expose the solution to daylight or to ultra violet rays with the intention of still further disaggregating the rubber.

As an example, 100 grammes of solution containing 11 grammes of the disaggregated mass is found to give a satisfactory product.

This solution is then chlorinated.

The required degree of chlorination may be effected by passing chlorine gas into the solution until it changes from a dark color which it first assumes, to a pale yellow color, it being unnecessary to prevent the heating of the solution which takes place during chlorination in this manner.

The vessel in which the chlorination is effected should be made of material, such as stone ware, which is unaffected by chlorine or hydrochloric acid.

Alternatively, the progress of the chlorination step in the process may be observed by noting the quantity of chlorine allowed to pass into the solution, and also by the type of film obtained by a "test drop".

On completion of the chlorination the chlorinated product is distilled to drive off the solvent together with the hydrochloric acid formed, the solvent being recovered in any suitable manner.

Distillation is conveniently carried out in vacuo.

The solution may be concentrated by distillation to any desired degree, and on completion of the distillation step in the process, the product is ready for use.

When the invention is carried out according to the example above set forth, the final product usually weighs 2¼ to 2½ time the weight of the rubber originally used.

It can be used for many purposes in manufactures, for example, it can be moulded under heat and pressure with or without the use of suitable fillers, or it can be used as a paint or lacquer in which case i is thinned in an appropriate solvent such as benzene or its homologues, pigment being added if required to impart the desired color. Other lacquer constituents such as gums may also be added.

A paint or lacquer so formed can be easily spread by means of a brush and presents an excellent surface which, when dry, is hard, waterproof and fireproof.

The viscosity of the solutions of the chlorinated product obtained depend and are in direct relationship to the viscosity of the disaggregated rubber solution used.

The chlorine content of the fully chlorinated disaggregated rubber lies between 50 and 60 per cent.

I claim:

1. A process for the production of a chlorinated rubber product capable of forming solutions of low viscosity consisting in rolling rubber in a mill until said rubber is disaggregated, making a solution of the disaggregated mass and passing chlorine through the solution.

2. A process for the production of a chlorinated rubber product capable of forming solutions of low viscosity consisting in rolling rubber in a mill until said rubber is disaggregated, making a solution of the disaggregated mass in a solvent such as chlorinated hydrocarbon and passing chlorine through the solution.

3. A process for the production of a chlorinated rubber product capable of forming solutions of low viscosity consisting in rolling rubber in a mill until said rubber is disaggregated, making a solution of the disaggregated mass, exposing said solution to light and passing chlorine through said solution.

4. A process for the production of a chlorinated rubber product capable of forming solutions of low viscosity consisting in rolling rubber in a mill until said rubber is disaggregated, making a solution of the disaggregated mass, passing chlorine through the solution and distilling said solution to remove the solvent and products other than the chlorinated rubber product.

5. A process for the production of a chlorinated rubber product capable of forming solutions of low viscosity consisting in rolling rubber in a mill until said rubber is disaggregated, making a solution of the disaggregated mass, passing chlorine through the solution and distilling said solution to remove a part of the solvent, said concentrated solution being used as a paint or lacquer.

In testimony whereof I have signed my name to this specification.

FRANCIS CLIFFORD DYCHE-TEAGUE.